(12) United States Patent
Schlumm et al.

(10) Patent No.: US 10,029,743 B2
(45) Date of Patent: Jul. 24, 2018

(54) INSULATING PANEL FOR A COMMERCIAL VEHICLE SUPERSTRUCTURE AND COMMERCIAL VEHICLE WITH A COMMERCIAL VEHICLE SUPERSTRUCTURE

(71) Applicant: Schmitz Cargobull AG, Altenberge (DE)

(72) Inventors: Michael Schlumm, Ahaus (DE); Reinhard Beelmann, Haltern am See (DE); Peter Schmitz, Altenberge (DE)

(73) Assignee: Schmitz Cargobull AG, Altenberge (DE)

( * ) Notice: Subject to any disclaimer, the term of this patent is extended or adjusted under 35 U.S.C. 154(b) by 0 days.

(21) Appl. No.: 15/316,316

(22) PCT Filed: Dec. 8, 2014

(86) PCT No.: PCT/EP2014/076903
§ 371 (c)(1),
(2) Date: Dec. 5, 2016

(87) PCT Pub. No.: WO2016/091280
PCT Pub. Date: Jun. 16, 2016

(65) Prior Publication Data
US 2017/0190363 A1    Jul. 6, 2017

(51) Int. Cl.
*B62D 33/04* (2006.01)
*B60P 3/20* (2006.01)

(52) U.S. Cl.
CPC ............. *B62D 33/048* (2013.01); *B60P 3/20* (2013.01)

(58) Field of Classification Search
CPC .................................. B62D 33/048; B60P 3/20
See application file for complete search history.

(56) References Cited

U.S. PATENT DOCUMENTS 6,093,481 A * 7/2000 Lynn ..................... B32B 5/20
                                                    428/217
2008/0174147 A1    7/2008 Skaradzinski

FOREIGN PATENT DOCUMENTS

| DE | 1704581 | 5/1971 |
|----|---------|--------|
| DE | 102005022868 A1 | 11/2006 |
| DE | 202007014-441 U1 | 2/2008 |
| DE | 102010051612 A1 | 7/2011 |
| EP | 1667890 B1 | 5/2011 |

* cited by examiner

*Primary Examiner* — Darrell G Dayoan
*Assistant Examiner* — Melissa Ann Black
(74) *Attorney, Agent, or Firm* — The Webb Law Firm (57) ABSTRACT

An insulating panel for a commercial vehicle superstructure, with an outer top layer and an inner top layer, including more than two plies, and with a core layer in a thermally insulating material between the top layers. At least one of the top layers is constructed as an at least three-ply sandwich, including an outer ply in light metal material associated with the respective outside of the insulating panel, an inner ply in light metal material associated with the core layer and a core ply having an integrally joined connection to the outer ply and the inner ply, including a core ply material having a higher strength than the light metal material of the outer and inner ply.

19 Claims, 5 Drawing Sheets

INSULATING PANEL FOR A COMMERCIAL VEHICLE SUPERSTRUCTURE AND COMMERCIAL VEHICLE WITH A COMMERCIAL VEHICLE SUPERSTRUCTURE

CROSS-REFERENCE TO RELATED APPLICATIONS

This application is the United States national phase of International Application No. PCT/EP2014/076903 filed Dec. 8, 2014, the disclosure of which is hereby incorporated in its entirety by reference.

BACKGROUND OF THE INVENTION

Field of the Invention

The invention relates to an insulating panel for use with a commercial vehicle superstructure and a commercial vehicle, intended for the transport of temperature-sensitive goods and which for this purpose has a commercial vehicle superstructure with a load compartment, in which the respective good is stowed during transport.

Description of Related Art

In order to guarantee sufficient thermal insulation on the one hand and sufficient rigidity for harsh day-to-day use on the other, the insulating panels referred to here normally have an outer top layer associated with the environment of the respective vehicle superstructure, an inner top layer associated with the load compartment surrounded by the vehicle superstructure, and a core layer disposed between these top layers in a thermally insulating material. Here the top layers do not just have a reinforcing function, but generally serve as a moisture barrier, in order to prevent ingress of moisture and other media from the environment of the insulating panel into its generally porous and accordingly absorbent core layer. At the same time the top layers should also be designed so that they provide a good optical appearance. In order to meet these requirements, the inner and outer top layers normally comprise more than two plies placed one on top of the other.

An example of an insulating panel, constructed as a multilayer composite and specially intended for use in insulated commercial vehicle trailers, containers or other insulated compartments, is described in EP 1667890 B1. The insulating panel here comprises two substantially gas impermeable liner panels.

The liner panel of the known insulating panel, which when in use is associated with the respective area to be protected from the environment, takes the form of an inherently stable laminate panel. To this end the top layer has a gas impermeable barrier ply, comprising for example a thin aluminium or PET film, and at least one structural polymer resin ply disposed coplanar to the barrier ply, and connected to the barrier ply. In the designs of the known insulating panel intended for practical use two fibre-reinforced structural polymer resin plies are provided, between which the barrier ply is arranged. The structural polymer resin plies and the barrier ply are connected in an integrally joined manner to form a solid laminate.

The other top layer of the known insulating panel associated with the free environment when in use, on the other hand, in its designs intended for practical use is manufactured as a single layer from a gas impermeable thick metal sheet, such as a thick aluminium or steel sheet.

In the known insulating panel, between the top layers an insulating core layer is disposed as usual, comprising a foamed plastic.

A basic problem in multi-layer insulating panels made from various materials is to ensure a durable, solid bond between the individual layers. Thus there are many materials which while having optimum characteristics in terms of their intended function provide only a poor integrally joined connection with one another. This is the case in particular if different plastics are to be connected together.

With the known insulating panel described above, the intention is for this problem to be solved in that in the top layer constructed as a laminate top layer, the fibres of the fibre-reinforced structural polymer resin ply associated with the core layer provide a bonding surface for the foam of the core layer. Because following foaming of the core layer the fibres of the structural polymer resin ply engage in the core layer, the intention is that a strong integrally joined connection is achieved, which despite its poor adhesiveness guarantees a durable bond between the foam of the insulating core layer and the associated structural polymer resin ply of the top layer.

Irrespective of the problem of the secure bonding of the core layer to the top layers the manufacture of insulating panels of the kind described above is expensive. This is particularly the case if the known insulating panel is intended to be equipped, as a top layer constructed as a laminate composite, to be sufficiently dent- and impact-resistant, to be able to reliably withstand the stresses occurring when it is put to work.

Against the background of the prior art described above a problem for the invention was to provide an insulating panel that can be economically manufactured and at the same time offer an optimum combination of minimal weight, high strength and inherent stability, and a high insulation effect.

An intention was similarly to indicate a commercial vehicle in which, apart from optimal thermal shielding of the temperature-sensitive good to be stowed in the load compartment of its superstructure, optimum resistance of the superstructure to the stresses occurring in particular during loading and unloading is guaranteed.

With regard to the insulating panel the invention has solved this problem.

With regard to a commercial vehicle intended for the transport of temperature-sensitive goods and which at the same time comprises a chassis, on which the wheels of the commercial vehicle are mounted, and a commercial vehicle superstructure supported by the chassis, which with its side walls, its floor and its roof surrounds a load compartment, in which the respective goods to be transported are stowed for transport, the problem stated above is however solved in that at least one of the side walls or the roof of the commercial vehicle superstructure is constructed from at least one insulating panel constructed according to the invention. This invention is thereby particularly suitable for commercial vehicles which are equipped with a temperature control, which actively keeps the temperature of the atmosphere in the load compartment of the commercial vehicle superstructure within a certain range.

SUMMARY OF THE INVENTION

An insulating panel according to the invention for use with a commercial vehicle superstructure accordingly has, in accordance with the state of the art set out above, an outer top layer associated with the environment of the respective vehicle superstructure, an inner top layer, associated with a load compartment surrounded by the vehicle superstructure, wherein the inner and the top layer each comprise more than two plies placed one on top of the other, and a core layer disposed between the top layers in a thermally insulating material.

According to the invention at least one of the top layers is designed as an at least three-ply sandwich, which comprises an outer ply in a light metal material associated with the respective outside of the insulating panel, an inner ply in a light metal material associated with the core layer and a core ply having an integrally joined connection with the outer ply and inner ply, consisting of a core ply material, having a higher strength than the light metal material of the outer and inner ply.

Unlike the state of the art described above, an insulating panel according to the invention has the advantage of optimised performance characteristics, in that at least one of its top layers is formed as a composite with a core ply, guaranteeing the inherent stability and strength required in each case and two top plies, respectively comprised light metal material, one of which is an inner ply associated with the core layer of the insulating panel, and the other an outer ply associated with the free environment of the insulating panel.

The inner and outer top ply of the top layer according to the invention formed as a sandwich respectively form on the one hand a barrier ply against the ingress of moisture, fumes or other media into the core layer connected with the sandwich top layer, which could damage the core layer comprising thermally insulating material.

On the other hand, the inner top ply of the top layer constructed as a sandwich, turned towards the core layer, forms an optimum substrate for the connection of the core ply material of the core layer of the insulating panel.

The outer top ply of the top layer constructed as a sandwich associated with the respective outside of the insulating panel top layer however already offers without any further measures a smooth and thus also good optical impression. This means that the respective top ply turned towards the outside can either be left uncoated or without expensive additional measures coated with a lacquer, film or similar.

The core ply of the top layer constructed as a sandwich according to the invention can however be optimised, in that the top layer has such a high inherent stability such good shock absorbing qualities, that the insulating panel according to the invention is able to reliably withstand the static and dynamic stresses occurring in heavy duty use. In particular, the insulating panel constructed according to the invention shows itself to be resistant to impacts directed against the top layers constructed as a sandwich and which occur because for example the transported good, or a lift truck during loading and unloading of a load compartment surrounded by an insulating panel according to the invention knocks against the top layer concerned.

The connection of the inner and outer plies made of light metal material to the core ply of the at least one sandwich top layer of an insulating panel according to the invention can in an in itself known manner take place by corresponding conditioning either of the associated surfaces of the core ply or the inner or outer ply. For this purpose, bonding agent plies can be applied to the core ply or the respective inner or outer top ply, in order to guarantee the adhesion of the inner and outer ply to the core ply of the sandwich top layer.

The connection of the at least one top layer constructed as a sandwich according to the invention to the core layer of the insulating panel according to the invention can similarly take place, in that the surface of the inner ply of the sandwich top layer of an insulating panel according to the invention associated with the core layer is conditioned such that a perfect integrally joined connection to the insulating material of which the core layer is comprised is guaranteed. To this end known physical or chemical processes can also be used, in order to bring about a surface activation of the light metal ply advantageous to an integrally joined connection. Alternatively, the inner ply can also be provided with a coating suitable for the integrally joined connection.

Accordingly, in order to connect the top layer to the core layer an intermediate layer can be provided, which on one side adjoins the core layer comprising insulating material and on the opposite side the metallic inner ply of the sandwich-top layer, wherein the side of the intermediate layer adjoining the core layer has an affinity to the adjoining material of the core layer and the side of the intermediate layer adjoining the inner ply of the sandwich top layer has an affinity to the metal material of the outer ply of the sandwich top layer.

It is conceivable here for the inner ply of the sandwich top layer provided according to the invention to perform the function of such an adhesion promoting intermediate ply. In this case the inner ply comprising light metal material, on the side on which it adjoins the core layer comprising insulating material, has an affinity to the material of the core layer, while on its side adjoining the core ply of the sandwich top layer it has an affinity to the core ply material of the core ply of the sandwich top layer.

Such a connection via an intermediate ply or its inner ply of a top layer constructed as a sandwich within the meaning of the present invention to the core layer of an insulating panel according to the invention is explained in detail in European patent application 13 195 689.8 of 4 Dec. 2013, the content of which is fully incorporated in this application and the priority of which is claimed by the present application.

In the European application 13 195 689.8 incorporated here a detailed description is provided of an insulating panel, in which top layers constructed as a sandwich are connected via a bonding agent ply to the core layer of the insulating panel. With this insulating panel described in the European patent application 13 195 689.8 incorporated here the core layer comprising thermally insulating material is disposed between two "outer skins". These "outer skins" in each case comprise a top layer constructed as a sandwich within the meaning of the present invention, formed by a single- or multi-layer, especially fibre-reinforced plastic "structural layer" (=core ply of the sandwich top layer according to the invention), an intermediate ply (=inner ply of the sandwich top layer according to the invention) disposed between the core layer and the "structural layer" made of light metal, in particular of aluminium and a "top layer" (=outer ply of the sandwich top layer according to the invention) applied to the side turned away from the core layer on the "structural layer", which similarly comprises a light metal material, in particular aluminium. In addition, the "top layer" on its side turned away from the "structural layer" can be coated with a "lacquer ply" (=additional ply of the sandwich top layer according to the invention).

The connection provided for in an insulating panel according to the invention of the core layer to the inner ply consisting of light metal of the respective top layer constructed as a sandwich allows a reliable, in particular exclusively integrally joined connection without the need for an additional integrally joined connection through additionally provided fibres or the like extending into the core layer and supported by the top layer.

In an insulating panel according to the invention the inner ply can have a flat construction. Optimally here the inner and outer ply have a similarly smooth form and are free from protrusions. The metallic inner and outer plies can thus be applied as thin films to the core ply of the sandwich top layer. Since here no consideration has to be given to the particular design of the inner or outer ply, this allows particularly simple prefabrication of the sandwich top layers.

Of course, the respective outer surface of the inner and outer ply of the sandwich top layer does not exclude the outer surface concerned having microscopically or macroscopically considered form elements, with which in addition to the integrally joined connection an integrally joined interlocking of the core layer material with the light metal material of the inner ply of the sandwich top layer takes place. A correspondingly activated surface structure can for example be created in an in itself known manner by treatment with an energy beam, e.g. by plasma- or laser beam-treatment, or by a chemical surface treatment, e.g. by pickling treatment. Appropriate surface activation can for example usefully take place on the surface of the inner ply associated with the core layer of the insulating panel. It may also be advantageous to activate the surface of the outer ply associated with the free outside of the insulating panel, if for example a lacquer or similar is to be applied as an additional ply to the outside of the insulating panel.

Alternatively, or in addition, to a surface activation of the sides of the core ply to be coated with the inner and outer ply for the integrally joined connection of the outer ply or the inner ply to the core ply in at least one of the top layers constructed as a sandwich between the outer ply and the core ply or the inner ply and the core ply a bonding agent ply can be provided.

The inner and the outer ply of the top layer constructed as a sandwich according to the invention can comprise any light metal material, having sufficient resistance to environmental influences and which can act as a gas or vapour block. For this, materials are necessary which limit to a minimum the diffusion of gases, such as oxygen, carbon dioxide or nitrogen, and/or vapours, such as water vapour or pentane gas. Optimally the blocking effect occurs here both in a direction towards the insulating panel and a direction away from the panel.

The blocking ply of the kind referred to here is also referred to as a "barrier ply", since in practice absolute gas- and/or vapour-tightness can rarely be achieved. The path of the gas from the panel outwards should be blocked, because in the core layer specific gases, such as pentane gas, may be contained, which support the thermal insulation effect of the core layer. In order to maintain a high thermal insulation effect, therefore, the gas should not be able to escape from the core layer. The path from the environment into the insulating panel should be blocked at the same time, in order in particular to prevent the ingress of moisture into the foam of the core layer.

Because in an insulating panel according to the invention the two plies of the top constructed as a sandwich top layer, namely the inner and outer plies in light metal material, block the passage of vapour or other gases and of liquids, optimum security against damage and loss of function of the core layer of the insulating panel is guaranteed.

For the inner and outer plies of the sandwich top layer of an insulating panel according to the invention having this blocking effect materials comprising aluminium or its alloys are particularly suitable. Magnesium or its alloys could be considered as well.

The respective light metal material of the inner or outer ply of the sandwich top layer can generally be rolled out to form thin films, which can be applied in a simple manner to the core ply of the sandwich top layer. Films consisting of aluminium alloys, which can be manufactured very thin in a simple manner, are particularly suitable for this. As an alternative to a film application, however, it is also conceivable to apply the light metal plies of the sandwich top layer by spraying or application of a substrate containing light metal particles to the core ply.

Typical thicknesses of the inner or outer ply of the top layer constructed as a sandwich are 30-400 μm, while the outer ply is typically 100-400 μm, in particular 200-300 μm, and the inner ply in particular 30-150 μm, thick.

The core ply material of a sandwich top layer according to the invention must have sufficient strength and rigidity in particular against impact loads. This combination of characteristics can be achieved by a using a fibre- or fabric-reinforced plastic for the core ply. Fibre-reinforced polymer materials are particularly suitable for this purpose, in particular thermoplastic, polypropylene or polyester materials.

The fibres can be introduced in an in itself known manner in irregular alignment as loose filling or as a nonwoven into the plastic of the core ply material. The advantage of individual fibres, which are embedded in a more or less disorderly manner in the core ply material, is that the core ply reinforced in this way does not have any distinct preferred direction, in which there is a particularly high or low strength.

In order to guarantee the necessary inherent stability and impact resistance, it may be advisable for the core ply of the top layer constructed as a sandwich to be formed of two or more respectively fibre-reinforced plastic plies. Here the fibres of the individual plastic plies can in each case be aligned in a preferred direction, wherein here also in order to guarantee optimum impact performance the preferred direction of the fibres of one plastic ply differs from the preferred direction of the fibres of the other plastic ply. Where two or more fibre-reinforced plastic plies are used for the core ply optimum strength and resistance to impact loads can be achieved. In order to guarantee optimum shape retention of the core ply, there is the possibility, if at least three fibre-reinforced plastic plies are provided, that the preferred directions of the fibres of at least two plies run parallel to each other and substantially perpendicularly to the preferred direction of the fibres of at least one further fibre-reinforced plastic ply. Such an alignment of the fibres can also be achieved in that the reinforcing fibres are introduced as a web into the core ply of the top layer.

In particular, in cases where a certain functional element is to be incorporated in an insulating panel according to the invention, it may be appropriate as an alternative or in addition to production of the core ply from plastic, if the core ply material in the area of the functional element concerned is a sheet material, in particular a sheet steel material. This allows simple securing and connection of the functional element in the insulating panel.

As in the single-layer top ply already mentioned above, in sheet material, which is used either alone as a top layer or as a core ply of the top layer constructed as a sandwich in accordance with the invention, through a suitable forming method tracks, mounts, indentations and similar form elements can be formed, which are for example needed to secure the good transported. These may for example be lashing rails or similar. It is of course conceivable here for sheet material to be combined with a fibre-reinforced plastic, in order to increase the dimensional stability of the intermediate ply beyond the inherent stability offered by the sheet material. The sheet material can, for example, be provided with a protective ply or be coated with a bonding agent as it is being processed, in order to allow a simple integrally joined connection of the optional additional plastic ply or the inner and outer ply of the sandwich top layer. It also goes without saying that the sheet material can also be surface activated in a suitable manner by physical or chemical treatment, in order to make connection of the various materials of the plies in the sandwich top layer easier.

Essentially, with an insulating panel according to the invention both top layers can be constructed as a sandwich. This may be appropriate when it can be assumed that stresses, acting in practical use on the top layers of the insulating panel, are approximately the same size or of the same kind. In many applications, however, the stress on the top layer, associated with the load compartment of the commercial vehicle superstructure, for which the respective panel has been used, differs from the stress on the top layer associated with the free environment of the superstructure. With such a stress expectation it is appropriate if one top layer of the insulating panel is constructed in the manner according to the invention as explained above as a sandwich and the other top layer as a single ply top layer similarly integrally connected with the core layer, comprising an inherently stable material.

Here this top layer can also be manufactured from a fibre- or fabric-reinforced polymer material, in particular a thermoplastic material, a polypropylene material or a polyester material, or a metal sheet material, in particular a steel sheet material. Such a single layer construction of one top layer can be advantageous if in the top layer concerned a form element such as a rail or similar is to be formed, which is necessary for securing or lashing the respective good to be transported.

Independently of how the top layers are constructed, they can in each case on their outside associated with the free environment be coated with one or more additional plies. These additional plies can in each case be a lacquer or film ply, wherein the additional ply can obviously also take the form of a lacquer system applied in multiple layers or a single or multiple film coating.

An insulating panel according to the invention accordingly comprises at least one top layer serving as an outer skin, the core ply of which performing the function of a structural layer comprises a core ply material which may for example be an in particular glass fibre-reinforced plastic applied in one or more layers, and which on the side, associated with the core layer of the panel made from a thermally insulating foam, is coated with an inner top ply comprising for example a light metal film, forming an intermediate layer between the core ply of the top layer and the core layer of the insulating panel, wherein the core ply of the top layer constructed as a sandwich of the insulating panel according to the invention at the same time on the side associated with the respective outside of the panel is coated with a further light metal ply, forming the outer top ply of the top layer. Here, on the outer ply of the sandwich top layer an additional ply can in turn be applied for example in the form of a lacquer or film ply.

BRIEF DESCRIPTION OF THE DRAWINGS

The invention is explained in the following by means of a drawing showing an embodiment. This shows schematically and not to scale as follows.

DETAILED DESCRIPTION OF THE INVENTION

Figure 1:
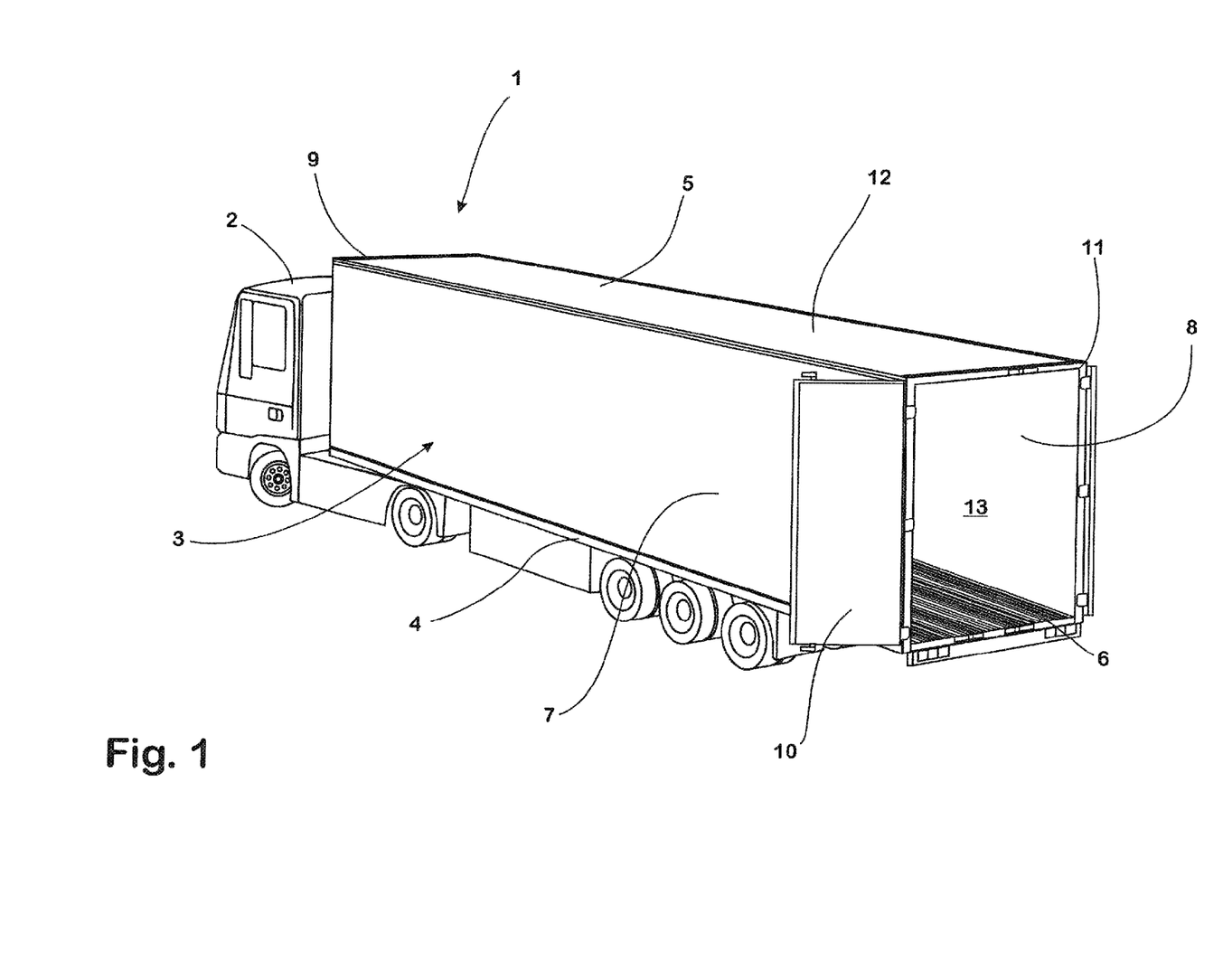
FIG. 1 shows a commercial vehicle in a perspective view from behind.

The commercial vehicle 1 shown in FIG. 1 is an articulated lorry, comprising a tractor unit 2 and a semitrailer 3 hauled by the tractor unit 2, also referred to in technical language as a "trailer". The semitrailer 3 designed for the transport of temperature-sensitive goods supports on a chassis 4 a rectangular box body 5, formed by a floor 6, longitudinal side walls 7, 8, and a front wall 9 associated with the tractor unit 2, a rear wall 11 provided with a double-wing door 10 and a roof 12. On the outside of the front wall 9 in a known manner a transport refrigeration unit (not shown) is secured. The transport refrigeration unit as a temperature control unit sets the temperature of the environment in the load compartment 13 of box body 5 and surrounded by the box body 5, at a predetermined temperature.

In the embodiment shown here of the commercial vehicle 1 the longitudinal side walls 7, 8 and the roof 12 of the box body 5 of the semitrailer 3 are in each case constructed from an insulating panel each. Here the insulating panels in each case extend over the entire area occupied by the respective side wall 7, 8 and the roof. In this way an optimum insulating effect is achieved with simultaneous minimised installation effort. Alternatively, it is of course also conceivable for the longitudinal side walls 7, 8 or the roof 12 to be comprised of a number of insulating panels placed next to each other and connected together in a suitable manner, which for example in each case extend across the height of the longitudinal sides 7, 8 or the width of the roof 12.

FIGS. 2 to 5 show different configurations of insulating panels P1, P2, P3 suitable for manufacturing the longitudinal side walls 7, 8 and of the roof 12.

The insulating panels P1, P2, P3, as shown in FIG. 1 by way of example using insulating panel P1, each take the basic form of a panel, the height H and length L of which are in each case considerably greater than their thickness d.

Each of the insulating panels P1, P2, P3 is constructed in a sandwich design with a core layer K, disposed between two top layers D1, D2 (insulating panel P1), D1', D2' (insulating panel P2) and D1", D2" (insulating panel P3).

The core layer K of the insulating panels P1, P2, P3 comprises in each case a foamed, closed pore plastic, which may for example be foamed polyurethane.

The thickness dK of the core layer K in insulating panels according to the invention is generally typically 15 to 400 times, in particular 20 to 360 times, the thickness dD of the top layers D1, D2. By way of example, the thickness dK in practice is 12-200 mm for a thickness dD of the top layers D1, D2 of 0.4-5 mm, in particular 1-2 mm.

Figure 2:
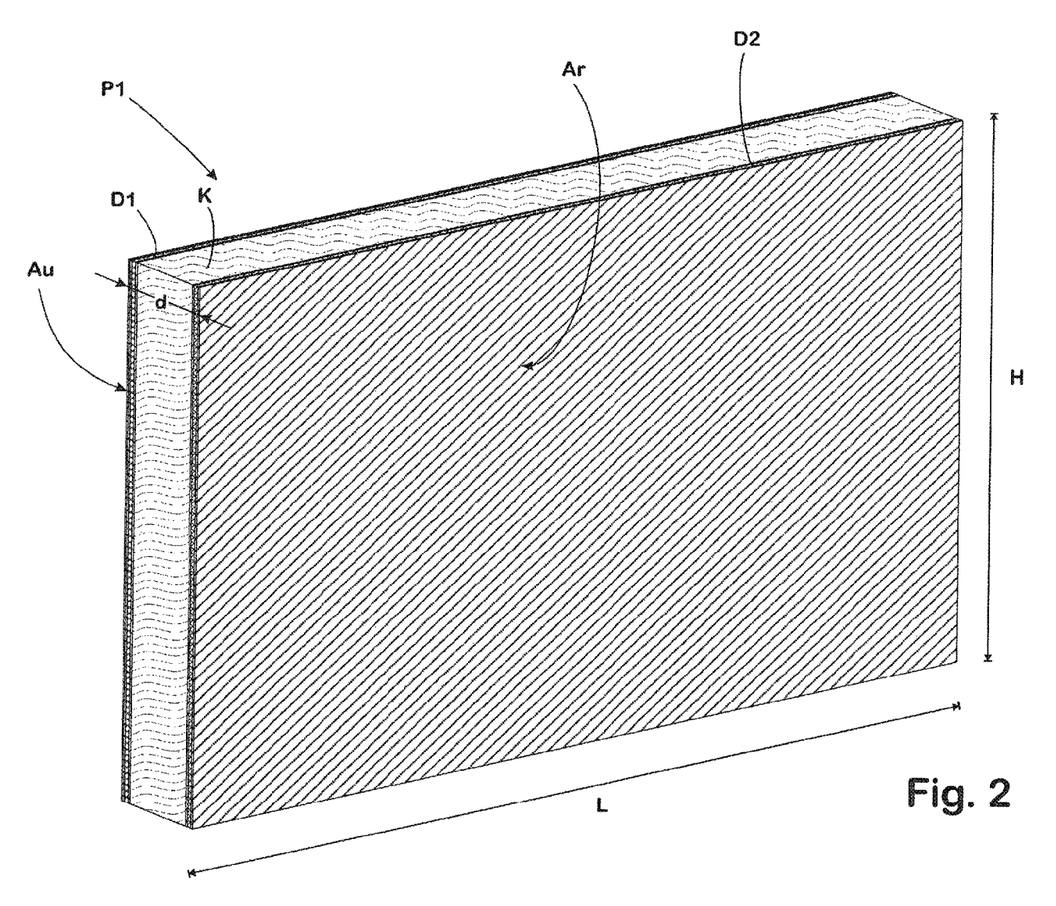
FIG. 2 shows an insulating panel in a perspective view.
Figure 3:
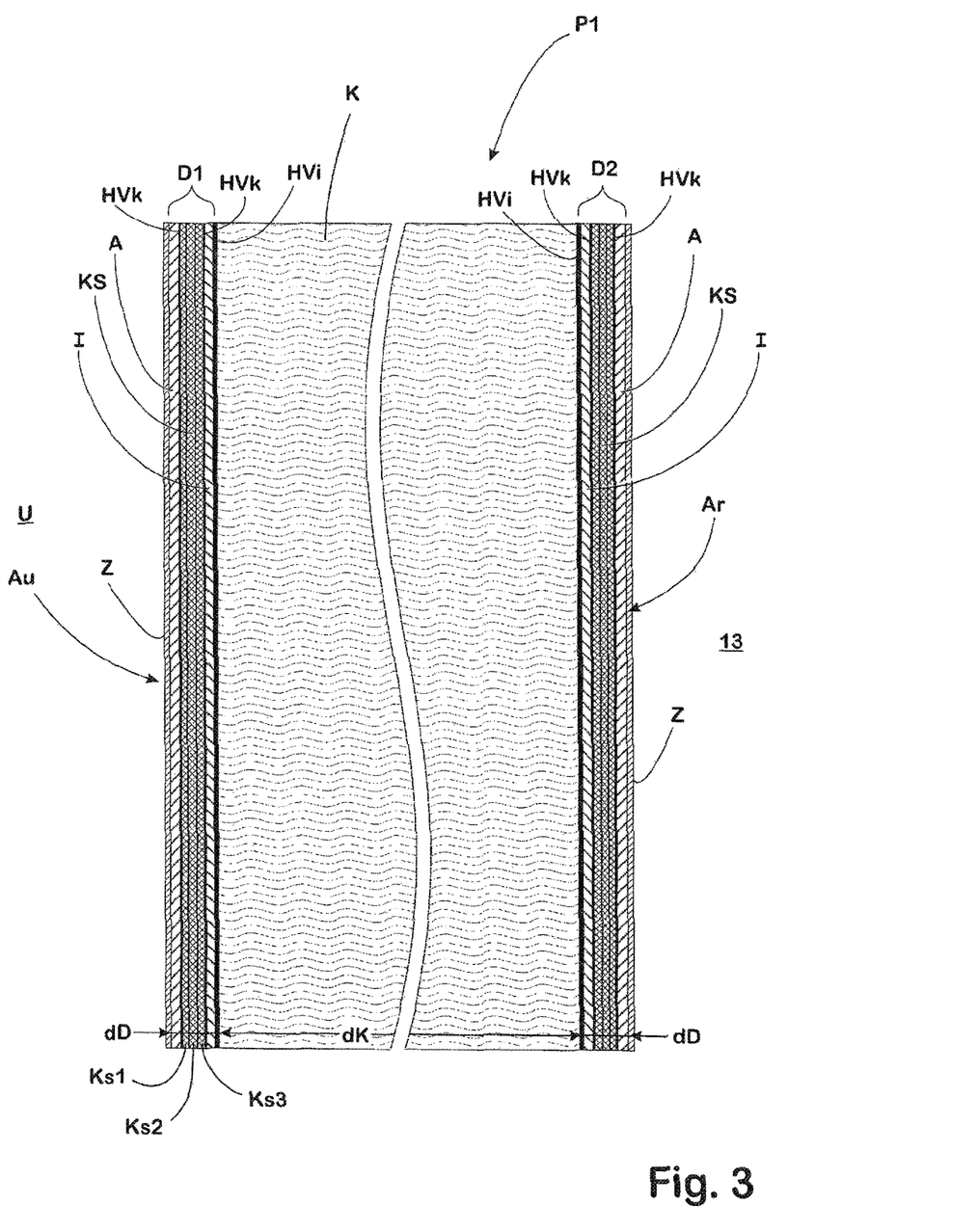
FIG. 3 shows the insulating panel according to FIG. 2 in a magnified view of a section of one of its longitudinal sides.

With the insulating panel P1 shown in FIGS. 2 and 3 the top layers D1, D2 have an identical sandwich construction. In each case they have a dimensionally stable core ply KS, which on its side associated with the core layer K is coated with an inner ply I and on its side associated with the respective free outside Au, Ar of the insulating panel P1 an outer ply A.

The core ply KS itself in turn has a multi-layer construction and is composed of three plies KS1, KS2, KS3 in fibre-reinforced plastic. Each of these fibre-reinforced plastic plies KS1, KS2, KS3 is approximately 100 µm to 500 µm, in particular 200 µm to 400 µm, thick. The fibres of the fibre-reinforced plastic plies KS1, KS2, KS3 of the core ply KS are here in each case aligned in a preferred direction. Here the fibres can be provided in the form of a web, embedded in the plastic of the respective ply KS1, KS2, KS3 and in which the fibres are in each case aligned in a preferred direction parallel to the plane in which the respective ply KS1, KS2, KS3 lies. The preferred directions of the fibres of the outer two fibre-reinforced plastic plies KS1, KS3 are the same here, while the preferred direction of the fibres of the middle plastic ply KS2 positioned between the outer two plastic plies KS1, KS3 of the core ply KS is aligned at right angles thereto. In this way, despite the large dimensions of the insulating panel P1 an optimum form retention, in particular evenness, with a simultaneously maximised shock absorbing capacity of the top layers D1, D2 is achieved.

The fibres used to reinforce the core ply KS are glass fibres. But other fibres, such as plastic fibres, basalt fibres, carbon fibres or graphite fibres can be used as an alternative. For the plastic forming the matrix of the fibre-reinforced plastic plies of the core ply KS in the top layers D1, D2 polypropylene is used. Virtually all thermoplastics, polyester materials or other polymers such as polyamide and similar can be used, however.

The inner ply I and the outer ply A in each case comprise a film with a thickness of between 30 µm and 150 µm, in particular between 50 µm and 100 µm, made from an aluminium material. On their side associated with the core ply KS the inner ply I and the outer ply A each support a bonding agent ply HVk with an affinity to the plastic of the ply KS, applied as a lacquer coating, via which the inner ply I and the outer ply A respectively have an integrally joined connection to the side of the core ply KS associated with them.

The inner plies I of the top layers D1, D2 in the same way have a bonding agent coating HVi with an affinity to the thermally insulating foam of the core layer K, via which the integrally joined connection of the top layers D1, D2 to the core layer K is made. The inner plies I thus form an intermediate ply, via which the here exclusively integrally joined connection between the structure-giving core ply KS, guaranteeing inherent stability and impact resistance, of the top layers D1, D2 and the core layer K of the insulating panel P1 is created.

The outsides Au, Ar of the outer plies A of the top layers D1, D2 of the insulating panel P1 in each case have a flat and smooth construction.

On its outside Au associated when in use with the free environment U, the outer ply A of the top layer D1 is coated with an additional ply Z, for example a lacquer. Likewise, the outside Ar of the outer ply A of the top layer D2 associated with the load compartment 13 is coated with an additional ply Z similarly in the form of a lacquer, in order to protect the outer ply A of the top layer D2 from corrosive attacks from the liquids or other media present in the load compartment 13. In order to guarantee a durable and secure bond of the additional plies Z to the respective outside Ar, Au, the outer plies A on the outsides Ar, Au in each case prior to application of the lacquer are surface-activated by a suitable physical or chemical process in an in itself known fashion. As an alternative to the lacquer ply a film or film composite could also be provided as an additional ply Z.

The rigidity achieved by the top layers D1, D2 and the impact behaviour of the insulating panel P1, thanks to the composite formed by the sandwich top layers D1, D2 and the core layer K, is so good that even impacts occurring with high kinetic energy can be withstood without visible damage.

Apart from the high inherent stability guaranteed by them and the shock absorbing capacity they provide, top layers D1, D2 with their inner ply I and outer ply A in each case form a double block against the passage of moisture or gases both from the environment U or the load compartment 13 in the direction of the core layer K and in the opposite direction from the core layer K in the direction of the environment U or the load compartment 13. Moisture, with which the atmosphere in the load compartment 13 is charged and which may condense on the outside Ar of the insulating panel P1, is thus prevented from penetrating the core layer K. Conversely, gas with which the pores of the core layer K are filled in order to improve the thermal insulation effect, is prevented from escaping through the top layers D1, D2 into the load compartment 13 or the free environment.

Figure 4:
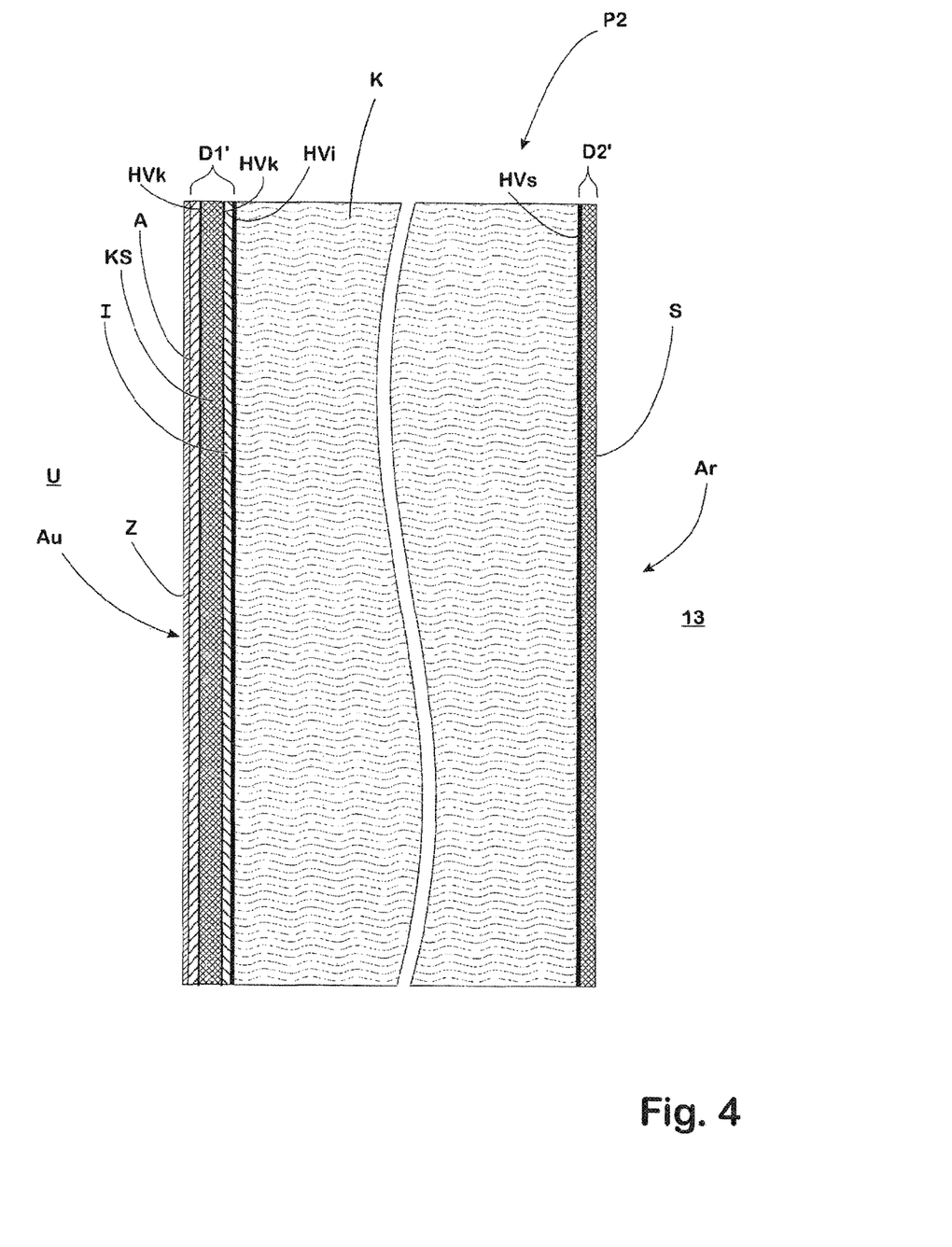
FIG. 4 shows a second configuration of an insulating panel in a view corresponding to FIG. 3.

The insulating panel P2 shown in FIG. 4 also has two top layers D1', D2' and a core layer K disposed between the top layers D1', D2', which here also comprises a heat-insulating, closed-pore, polyurethane foam. The top layer D1' associated with the environment U has the same sandwich structure as the top layer D1 of the insulating panel P1. The top layer D2 associated with the load compartment 13 in this case comprises just a steel sheet S, however, which is coated in a continuous process (coil coating) with a protective coating. Via a bonding agent ply HVs disposed between the core layer K and the top layer 2 the steel sheet top layer is connected with the foam of the core layer K in an integrally joined manner. The bonding agent ply HVs can also be dispensed with, if the steel sheet S of the top layer D2' on its surface associated with the core layer K is activated by a suitable treatment, e.g. plasma beams, so that the foam of the core layer K when it is foamed on the steel sheet S forms an integrally joined connection with the surface concerned.

Figure 5:
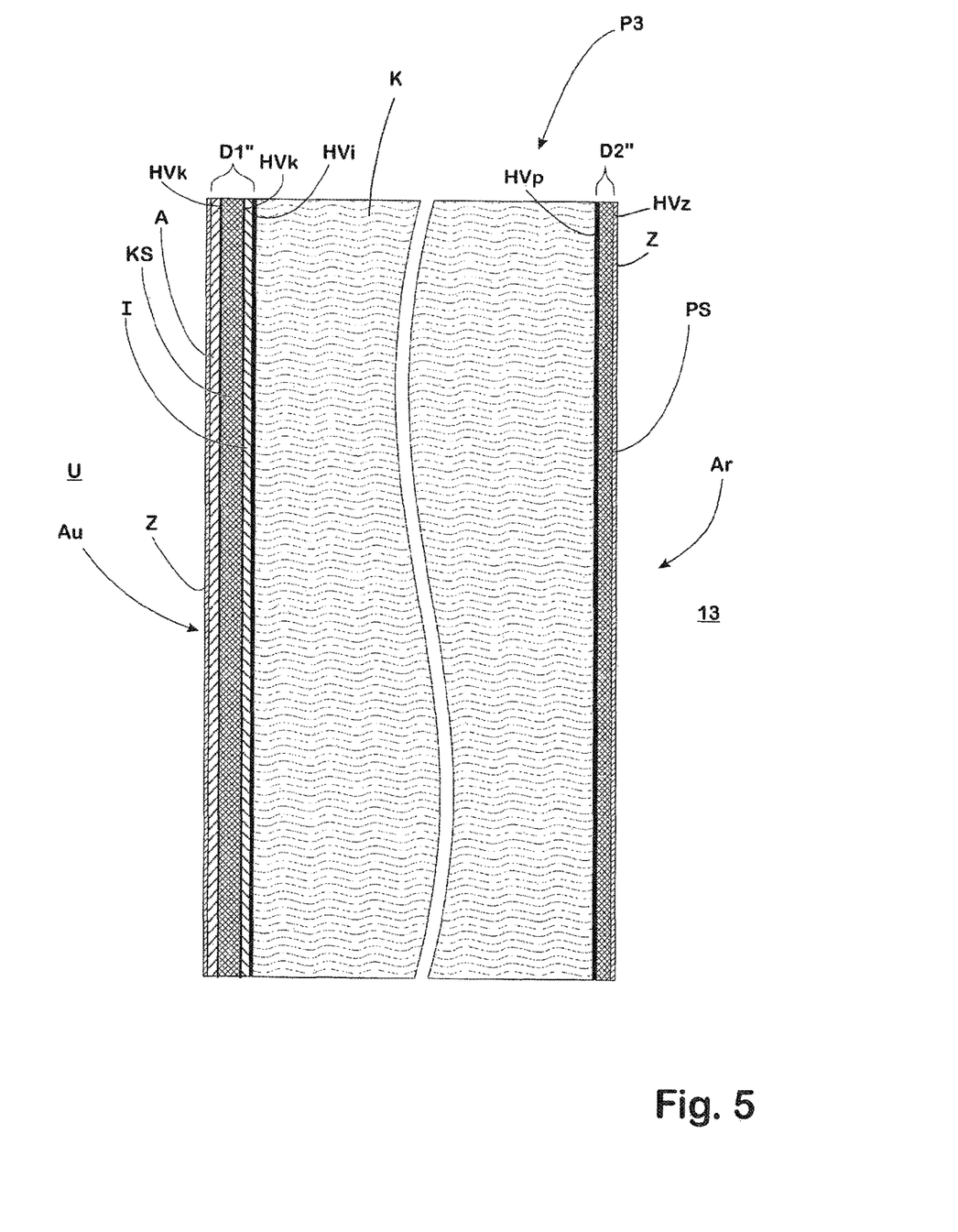
FIG. 5 shows a third configuration of an insulating panel in a view corresponding to FIG. 3.

With the insulating panel P3 shown in FIG. 5 the top layer D1" associated with the environment U like the top layers D1, D2 of the insulating panel P1 and the top layer D1' of the insulating panel P2 in turn takes the form of a sandwich with an inner ply I associated with the core layer K of the insulating panel P3 and having an integrally joined connection with it, consisting of an aluminium film, a core ply KS having an integrally joined connection with the inner ply I, comprising a number of fibre-reinforced plastic plies, and an outer ply A associated with the environment U, similarly having an integrally joined connection with the core ply KS. The outer ply A also supports, like the outer plies A of the top layers D1, D2, D1' on its outside associated with the environment U an additional ply Z.

The top layer D2" of the insulating panel P3 however, is formed by a polyester ply PS, which on its outside Ar associated with the load compartment 13 is coated with an additional ply Z. The additional ply Z is a lacquer which via a bonding agent ply HVz applied to the polyester ply PS, is connected to the polyester ply PS. On its side associated with the core layer K the polyester ply PS is similarly coated with a bonding agent ply HVp, which ensures that the foam of the core layer K has a durable integrally joined connection to the polyester ply PS of the top layer D2".

KEY

1 Commercial vehicle
2 Tractor unit
3 Semitrailer
4 Chassis of semitrailer 3
5 Box body (commercial vehicle superstructure) of semitrailer 3
6 Floor of box body 5
7,8 Longitudinal side walls of box body 5
8 Front wall of box body 5
10 Double-wing door of box body 5
11 Rear wall of box body 5
12 Roof of box body 5
13 Load compartment of box body 5
P1,P2,P3 insulating panel
D1,D2 top layers of insulating panel P1
D1',D2' top layers of insulating panel P2
D1",D2" top layers of insulating panel P3
H Height of insulating panels P1, P2, P3
L Length of insulating panels P1, P2, P3
d Thickness of insulating panels P1, P2, P3
K Core layer of insulating panels P1, P2, P3
dK Thickness of core layer K
dD Thickness of top layers D1, D2
KS Core ply
I Inner ply
Ar Outside of insulating panels P1-P3 associated with load compartment 13
Au Outside of insulating panels P1-P3 associated with environment U
A Outer ply
KS1-KS3 plies of core ply KS
HVk Bonding agent ply
HVi Adhesion-promoting coating
Z Additional ply
S Steel sheet
HVs Bonding agent ply
PS Polyester ply
HVz Bonding agent ply
HVp Bonding agent ply
U Environment

The invention claimed is:

1. An insulating panel for use with a commercial vehicle superstructure, with an outer top layer associated with an environment of the respective vehicle superstructure and an inner top layer, associated with a load compartment surrounded by the vehicle superstructure, wherein the inner and the outer top layer in each case comprise more than two plies positioned on top of each other, and with a core layer disposed between the top layers in a thermally insulating material, wherein at least one of the top layers is constructed as at least a three-ply sandwich which comprises
an outer ply in a light metal material associated with a respective outside of the insulating panel,
an inner play in a light metal material associated with the core layer and
a core ply having an integrally joined connection with the outer ply and inner ply, consisting of a core ply material, having a higher strength than the light metal material of the outer and inner ply,
wherein the core ply is constructed from two or more different plies with an integrally joined connection to one another.

2. The insulating panel according to claim 1, wherein the inner ply of the at least one top layer constructed as a sandwich has an integrally joined connection to the core layer of the insulating panel.

3. The insulating panel according to claim 1, wherein a surface of the inner ply of the respective top layer constructed as a sandwich associated with the core ply is smooth.

4. The insulating panel according to claim 1, wherein the respective top layer constructed as a sandwich has an exclusively integrally joined connection to the core layer.

5. The insulating panel according to claim 4, wherein for the integrally joined connection of the respective top layer to the core layer between the respective top layer and the core layer an intermediate ply is provided, via which the core layer makes an integrally joined connection to the respective top layer, in that a side of the intermediate layer adjoining the core layer has an affinity to a material adjoining it and a side of the intermediate layer adjoining the top layer has an affinity to the material of the ply of the top layer associated with it.

6. The insulating panel according to claim 1, wherein for an integrally joined connection of the outer ply or the inner ply to the core ply in at least one of the top layers constructed as a sandwich between the outer ply and the core ply or the inner ply and the core ply a bonding agent ply is provided.

7. The insulating panel according to claim 1, wherein the light metal material, of which the inner ply or the outer ply of the respective top layer constructed as a sandwich is comprised, is an aluminium material.

8. The insulating panel according to claim 1, wherein the core ply material is a fibre- or fabric-reinforced plastic.

9. The insulating panel according to claim 8, wherein the core ply material is a fibre-reinforced polymer material.

10. The insulating panel according to claim 1, wherein the core ply material in an area of a functional element incorporated into the insulating panel according to the invention is a steel sheet.

11. The insulating panel according to claim 1, wherein one top layer is constructed as a sandwich and the other top layer is constructed as a single-layer top ply having an integrally joined connection to the core layer, consisting of an inherently stable material.

12. The insulating panel according to claim 1, wherein at least one of the top layers on its outside turned away from the core layer is coated with an additional ply.

13. A commercial vehicle for the transport of temperature-sensitive goods comprising a chassis, on which the wheels of the commercial vehicle are mounted, and a commercial vehicle superstructure supported by the chassis, which with side walls, a floor and a roof surrounds a load compartment, in which the respective goods to be transported are stowed for transport, wherein at least one of the side walls or the roof is constructed from at least one insulating panel constructed according to claim 1.

14. The commercial vehicle according to claim 13, wherein the commercial vehicle is equipped with a temperature control, which keeps the temperature of the atmosphere in the load compartment within in a certain range.

15. The insulating panel according to claim 9, wherein the fibre-reinforced polymer material is a thermoplastic material, a polypropylene material, or a polyester material.

16. The insulating panel according to claim 2, wherein a surface of the inner ply of the respective top layer constructed as a sandwich associated with the core ply is smooth.

17. The insulating panel according to claim 2, wherein the respective top layer constructed as a sandwich has an exclusively integrally joined connection to the core layer.

18. The insulating panel according to claim 2, wherein for the integrally joined connection of the outer ply or the inner ply to the core ply in at least one of the top layers constructed as a sandwich between the outer ply and the core ply or the inner ply and the core ply a bonding agent ply is provided.

19. The insulating panel according to claim 2, wherein the light metal material, of which the inner ply or the outer ply of the respective top layer constructed as a sandwich is comprised, is an aluminium material.

* * * * *

UNITED STATES PATENT AND TRADEMARK OFFICE
CERTIFICATE OF CORRECTION

| | | |
|---|---|---|
| PATENT NO. | : 10,029,743 B2 | Page 1 of 1 |
| APPLICATION NO. | : 15/316316 | |
| DATED | : July 24, 2018 | |
| INVENTOR(S) | : Michael Schlumm et al. | |

It is certified that error appears in the above-identified patent and that said Letters Patent is hereby corrected as shown below:

In the Claims

Column 11, Line 62, Claim 1, delete "play" and insert -- ply --

Signed and Sealed this
Ninth Day of October, 2018

Andrei Iancu
*Director of the United States Patent and Trademark Office*